Oct. 17, 1950

M. S. SURRE ET AL 2,526,096

TRUING DEVICE

Filed Nov. 19, 1947

INVENTOR.
Steve Csencsics
Milton S. Surre
BY
Florian G. Miller
Atty

Patented Oct. 17, 1950

2,526,096

UNITED STATES PATENT OFFICE 2,526,096

TRUING DEVICE

Milton S. Surre and Steve Csencsics, Erie, Pa.; said Csencsics assignor to said Surre Application November 19, 1947, Serial No. 786,868

2 Claims. (Cl. 33—203.16)

1

This invention relates generally to wheel truing devices and more particularly to a wheel truing device for truing bicycle wheels.

Wheel truing devices made in accordance with the teachings of the prior art, and with which we are familiar, provide no means for adjusting the device for accommodating different diameters of wheels. It has, therefore, been necessary to provide several sizes of truing devices to accommodate different sizes of wheels. These prior truing devices also required considerable time and labor to set up and true a wheel.

It is, accordingly, an object of our invention to overcome the above and other defects in wheel truing devices and it is more particularly an object of our invention to provide a wheel truing device which is simple in construction, economical in cost, economical in manufacture, and efficient in use.

Another object of our invention is to provide a wheel truing device which is radially and laterally adjustable to permit truing of various sizes of wheels both laterally and on the outer periphery thereof.

Another object of our invention is to provide a wheel truing device which has novel clamping means for clamping the axle of a bicycle wheel therein with a minimum of effort.

Other objects of our invention will become evident from the following detailed description, taken in conjunction with the accompanying drawings, in which.

Figure 3:
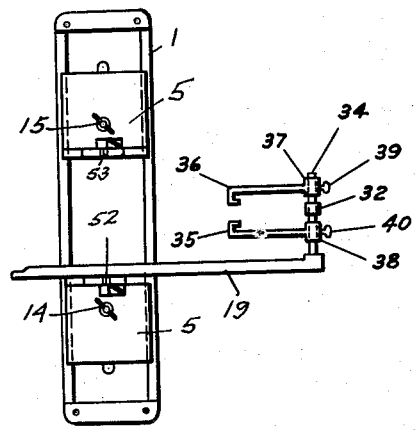
Fig. 3 is a plan view of our novel wheel truing device.
Figure 1:
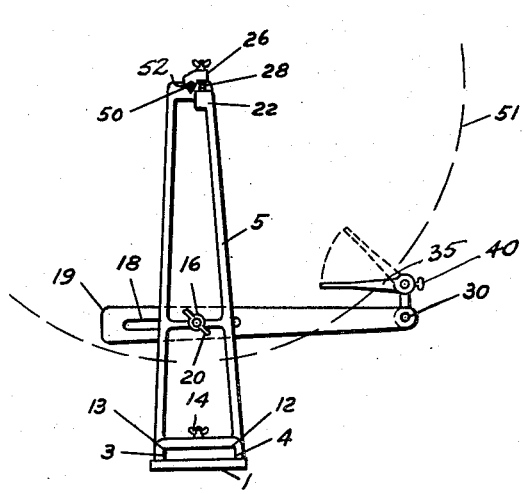
Fig. 1 is a side elevational view of our novel wheel truing device.
Figure 2:
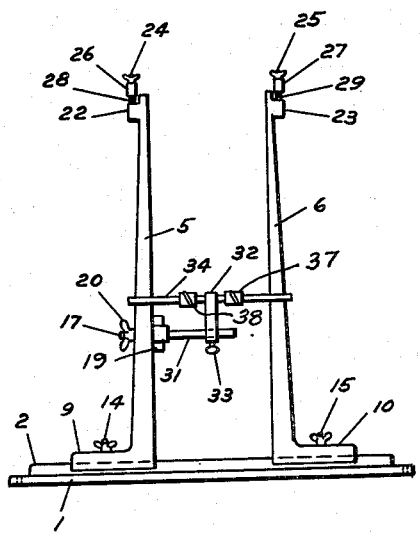
Fig. 2 is an end elevational view of our novel wheel truing device.

Referring now to the drawings, we show in Figs. 1, 2 and 3 a base 1 having an upwardly projecting longitudinally extending guiding portion 2 generally rectangular in shape and having parallel sides 3 and 4. Opposed L-shaped standards 5 and 6 have feet 9 and 10 with grooves 12 and 13 for slidably engaging the guiding portion 2 of the base 1. Locking screws 14 and 15 extend through the feet 9 and 10 of the standards 5 and 6 to lock the standards 5 and 6 in any predetermined relative position. Standard 5 has a transverse bossed portion 16 for receiving a threaded bolt 17 which extends through the slotted portion 18 of an outwardly extending arm 19. Wing nut 20 threadably engages the threaded bolt 17 to secure the arm 19 in any desired angular or lateral position in accordance with the diameter of the wheel be-

2 ing trued. The standards 5 and 6 also have vertically extending, internally threaded bossed portions 22 and 23 for threadably engaging threaded locking screws 24 and 25. Clamping members 26 and 27 are urged upwardly against the head of the screws 24 and 25 by spring members 28 and 29. The clamping members 26 and 27 frictionally engage a shaft 50 of a wheel 51 (shown in dotted line in Fig. 1) disposed in V-slots 52 and 53 in the standards 5 and 6.

A transverse aperture 30 is provided in the outer enlarged end of the arm 19 for receiving outwardly extending transverse shaft 31. An angularly and laterally adjustable support member 32 is mounted on the shaft 31 and is secured thereto by a locking screw 33. A second transverse shaft 34 is supported on the upper end of the support member 32 in parallel relation to the shaft 31. Angularly and laterally adjustable fingers 35 and 36 having enlarged transversely apertured ends 37 and 38 are mounted on the shaft 34. Locking screws 39 and 40 are provided to lock the fingers 35 and 36 in any lateral or angular position.

In operation, the shaft 50 of a wheel 51 is disposed in the V-slots 52 and 53 on the upper end of the standards 5 and 6 and the clamping members 26 and 27 are engaged therewith with enough tension to hold the shaft 50 in the V-grooves 52 and 53 while still permitting free rotation of the wheel 51. The arm 19 is then adjusted outwardly or inwardly as desired and locked in the desired position by the wing nut 20. The fingers 35 and 36 are then disposed immediately adjacent each other and substantially perpendicular to a tangent line to the periphery of the wheel to be trued and are locked in this position by the locking screws 39 and 40. The wheel 51 is then rotated and adjusted until the periphery thereof is trued with reference to the ends of the fingers 35 and 36. The locking screws 39 and 40 are then loosened and the fingers 35 and 36 are separated and drawn inwardly by adjusting the arm 19 until they are adjacent the rim of the wheel 51 or by adjusting the support member 32 or both. The fingers 35 and 36 are then drawn toward each other until they are disposed adjacent both sides of the rim of the wheel 51 and are locked in this position by the locking screws 39 and 40. The wheel 51 is then rotated and adjusted for lateral misalignment with reference to the fingers 35 and 36.

It will be evident from the foregoing description that we have provided laterally adjustable standards, an angularly and laterally adjustable arm for accommodating different diameters of wheels, angularly and laterally adjustable fingers for accommodating different widths of wheels, and an angularly and laterally adjustable support for the fingers, thereby providing a novel universal wheel truing device of novel design and construction.

Various changes may be made in the specific embodiment of our invention without departing from the spirit thereof or from the scope of the appended claims.

What we claim is:

1. A wheel truing device comprising a base, laterally adjustable standards on said base movable relative to each other, aligned V-shaped slots on the upper end of said standards for journalling an axle of a wheel, means for holding the axle of a wheel in said V-slots, a laterally, outwardly extending arm on one of said standards longitudinally and angularly adjustable with respect thereto, a transverse shaft carried on the outer end of said arm, a support mounted on said shaft longitudinally and rotatively adjustable with respect to the axis of said shaft, a second shaft parallel to said first mentioned shaft mounted on said support, and opposing fingers mounted on said second shaft adjustable longitudinally and rotatively thereof.

2. A wheel truing device comprising a base, vertically extending, relatively adjustable, parallel standards slidably disposed on said base, one of said standards having a transverse aperture, means for carrying a shaft on the upper end of said standards, a longitudinally slotted arm extending laterally outwardly from said apertured standard, a bolt and nut assembly extending through the slotted portion of said arm and through the aperture in said apertured standard for securing said arm in any predetermined angular and longitudinal position with respect to said standards, a transverse shaft carried on the outer end of said arm, a support mounted on said shaft, means for securing said support on said shaft in any predetermined longitudinal position thereon and in any rotative position with respect thereto, a second shaft carried by said support, opposed fingers mounted on said second shaft, and means for securing said fingers in any predetermined position relative to each other on said second mentioned shaft and in any predetermined rotative position thereon.

MILTON S. SURRE.
STEVE CSENCSICS.

REFERENCES CITED

The following references are of record in the file of this patent:

UNITED STATES PATENTS

| Number | Name | Date |
|---|---|---|
| 536,377 | Dudly | Mar. 26, 1895 |
| 563,944 | Thiem | July 14, 1896 |
| 2,429,139 | Scardaccione | Oct. 14, 1947 |

FOREIGN PATENTS

| Number | Country | Date |
|---|---|---|
| 33,524 | Denmark | July 30, 1924 |
| 725,963 | France | Feb. 22, 1932 |
| 888,522 | France | Sept. 6, 1943 |